No. 636,896. Patented Nov. 14, 1899.
G. H. CLARK.
PNEUMATIC WHEEL TIRE.
(Application filed May 24, 1899.)
(No Model.)
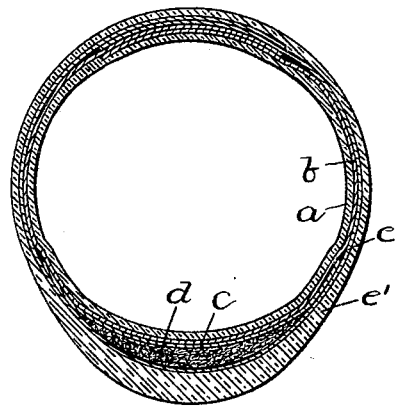
Witnesses:
H. B. Davis.
Jennie L. Hutchinson.
Inventor:
George H. Clark
by B. J. Noyes,
Atty

UNITED STATES PATENT OFFICE.

GEORGE H. CLARK, OF BOSTON, MASSACHUSETTS.

PNEUMATIC WHEEL-TIRE.

SPECIFICATION forming part of Letters Patent No. 636,896, dated November 14, 1899.

Application filed May 24, 1899. Serial No. 718,044. (No model.)

*To all whom it may concern:*

Be it known that I, GEORGE H. CLARK, of Boston, county of Suffolk, and State of Massachusetts, have invented an Improvement in Pneumatic Wheel-Tires, of which the following description, in connection with the accompanying drawings, is a specification, like letters on the drawings representing like parts.

This invention relates to pneumatic wheel-tires, and has for its object to produce a tire having a non-puncturable tread which shall be light and very resilient and which may be securely attached to the contiguous parts of the tire by vulcanization.

In accordance with this invention the tire consists, essentially, of an air-tube inclosed within a wrapper of expansible material—such, for instance, as a strip of canvas cut on the bias, a non-extensible strip secured to the tread side of said inclosed air-tube, and a resilient protecting-strip secured to the outer or tread side of said non-extensible strip, which is composed, essentially, of granulated, ground, or powdered cork and rubber, said materials being formed into substantially a homogeneous mass and in the proportions of about half and half, and an outer covering which may be and preferably is composed of an inner canvas layer and an outer rubber layer. All of the aforesaid parts will be vulcanized together, and as the resilient protecting tread-strip contains a large percentage of rubber it will readily vulcanize to the contiguous parts of the tire and be thereby firmly secured in place from end to end and from side to side.

I find in practice that a tread-strip composed of rubber and granulated, ground, or powdered cork produces a very resilient tread-strip, which not only gives the tire the required resiliency, but also effectually protects the air-tube from punctures, and, furthermore, such a tread-strip may be firmly secured in place by uniting at all parts with the contiguous parts of the tire during the process of vulcanization.

The drawing shows in cross-section a pneumatic wheel-tire embodying this invention.

*a* represents the air-tube, which is of any usual or suitable construction. *b* is a canvas or other wrapper thereon which completely incloses it, and said wrapper is made expansible to a certain extent—as, for instance, it may be made by cutting the canvas on the bias. *c* represents a non-extensible strip which may be also composed of canvas or other suitable material, and said strip is placed upon the outer or tread side of the inclosed air-tube.

*d* represents the resilient protecting-strip, which is composed of granulated, ground, or powdered cork and rubber made into substantially a homogeneous mass in the proportions of about half and half, although I prefer to add a small percentage of vegetable pitch in some instances. These relative proportions, however, may be varied more or less. The resilient protecting-strip *e* is secured to the outer or tread side of the non-extensible strip *c*. An outer covering is then applied, which is herein shown as composed of an inner layer of canvas or other suitable material *e* and an outer layer of rubber *e'*, although any usual or suitable outer covering may be employed in lieu of that herein shown.

The layers or wrappers of canvas may be coated with rubber or with rubber-cement, if desired, to enhance their tendency to adhere to the contiguous parts during the manufacture of the tire.

The tire thus constructed is vulcanized and all of the aforesaid parts firmly secured together by such process.

Prior to this invention many forms of tread-strips have been made, but, so far as I am aware, no tread-strip has ever been made composed, essentially, of granulated, ground, or powdered cork and rubber, whereby a light, flexible, and very resilient tread-strip is produced and one that can be firmly secured in place by vulcanization.

I claim—

In a pneumatic wheel-tire, an air-tube, an expansible wrapper inclosing it, a non-extensible strip secured to the tread side of said inclosed air-tube, a resilient protecting-strip secured to the outer side of said non-extensible strip composed essentially of granulated, ground or powdered cork and rubber, and an outer covering for the aforesaid parts, all of said parts being vulcanized together, substantially as described.

In testimony whereof I have signed my name to this specification in the presence of two subscribing witnesses.

GEORGE H. CLARK.

Witnesses:
B. J. NOYES,
JENNIE L. HUTCHINSON.